United States Patent Office
3,024,261
Patented Mar. 6, 1962

3,024,261
N-ALKYL IMIDOHALOARSENITES
George Andrew Olah and Alexes Alexander Oswald,
Sarnia, Ontario, Canada
No Drawing. Filed July 13, 1959, Ser. No. 826,422
8 Claims. (Cl. 260—440)

This invention relates to N-alkyl imidohaloarsenites corresponding with the formula R—N=As—X In this and succeeding formulae, R represents lower-alkyl and X represents chlorine or fluorine. The expression "lower-alkyl" is employed in the present specification and claims to refer to the alkyl radicals containing from 1–5 carbon atoms, inclusive. These compounds are liquid or crystalline solid materials which are somewhat soluble in a great number of organic solvents and slowly undergo hydrolysis in the presence of water. The compounds are useful for the preparation of a great number of more complex arsenic derivatives. The compounds have also been found to be useful as parasiticides and are adapted to be employed as active toxic constituents in compositions for the control of a number of fungal, bacterial, mite and insect pests.

The new compounds may be prepared by reacting a mono(lower-alkyl)amine with arsenic trichloride or arsenic trifluoride. The reaction is carried out in the presence of an inert organic liquid such as toluene or benzene as reaction medium. Good results are obtained when employing one molecular proportion of the arsenic trihalide reagent with at least two molecular proportions of the amine reagent. The reaction is somewhate exothermic and takes place smoothly at the temperature range of from —20° to 30° C. with the production of the desired product and hydrogen halide of reaction. Hydrogen halide appears in the reaction mixture as the hydrohalide salt of the amine reactant. The temperature may be controlled by regulating the rate of intermixing the reactants and by external cooling.

In carrying out the reaction, the arsenic trihalide and amine reagent are contacted together in the organic liquid medium. The contacting is carried out under the disclosed temperature conditions, and the reaction mixture maintained for a period of time under these conditions to complete the reaction. Upon completion of the reaction, the amine hydrohalide is removed by filtration and the filtrate thereafter fractionally distilled under reduced pressure to obtain the desired product.

The following examples merely illustrate the invention and are not to be construed as limiting.

*Example 1.—N-Ethyl Imidochloroarsenite*

Ethylamine (0.21 gram mole) is dispersed in 50 milliliters of toluene and the resulting mixture added portionwise with stirring to 0.1 gram mole of arsenic trichloride dispersed in 150 milliliters of toluene. The addition is carried out in 0.5 hour and at a temperature of from 0° to 10° C. Following the addition, the reaction mixture is allowed to come to room temperature and stirred for an additional hour. Upon completion of the reaction, the reaction mixture is filtered to separate ethylamine hydrochloride and the filtrate fractionally distilled under reduced pressure to obtain an N-ethyl imidochloroarsenite product as a crystalline solid material melting at 90°–95° C. and boiling at 155° C. at 10 millimeters pressure.

*Example 2.—N-Ethyl Imidofluoroarsenite*

Ethylamine (0.2 gram mole) is dispersed in 40 milliliters of toluene and the resulting mixture added portionwise with stirring to 0.1 gram mole of arsenic trifluoride dispersed in 140 milliliters of toluene. The addition is carried out in 25 minutes and at a temperature of from —10° to 5° C. Following the addition, the reaction mixture is allowed to come to room temperature and stirred for an additional 0.75 hour. Upon completion of the reaction, the reaction mixture is filtered and thereafter treated as described in Example 1 to obtain an N-ethyl imidofluoroarsenite product as a liquid material boiling at 180°–182° C. at 12 millimeters pressure and having a refractive index $n/D$ of 1.5752 at 20° C.

*Example 3.—N-Tert.-Butyl Imidochloroarsenite*

Tert.-butylamine (0.2 gram mole) is dispersed in 50 milliliters of benzene and the resulting mixture added portionwise with stirring to 0.1 gram mole of arsenic trichloride dispersed in 140 milliliters of benzene. The addition is carried out over a period of 0.5 hour and at a temperature of from 0° to 15° C. Following the addition, the reaction mixture is allowed to come to room temperature and thereafter stirred for an additional 30 minutes. The reaction mixture is then processed as previously described to obtain an N-tert.-butyl imidochloroarsenite product as a liquid material boiling at 114°–115° C. at 10 millimeters pressure and having a chlorine content of 19.53 percent as compared to a theoretical content of 19.9 percent.

*Example 4.—N-Isopropyl Imidochloroarsenite*

Isopropylamine (0.2 gram mole) is dispersed in 60 milliliters of toluene and the resulting mixture added portionwise with stirring to 0.1 gram mole of arsenic trichloride dispersed in 150 milliliters of toluene. The addition is carried out over a period of 30 minutes and at a temperature of from 0°–15° C. Following the addition, the reaction mixture is allowed to come to room temperature and thereafter stirred for an additional hour. The reaction mixture is then processed in the usual fashion to obtain an N-isopropyl imidochloroarsenite product as a liquid material boiling at 152°–153° C. at 10 millimeters pressure and having a refractive index $n/D$ of 1.9564 at 20° C.

*Example 5.—N-Isopropyl Imidofluoroarsenite*

Isopropylamine (0.21 gram mole) is dispersed in 50 milliliters of benzene and the resulting mixture added slowly portionwise with stirring and cooling to 0.1 gram mole of arsenic trifluoride dispersed in 150 milliliters of benzene. The addition is carried out over a period of 30 minutes and at a temperature of from 0°–5° C. Following the addition, the reaction mixture is allowed to come to room temperature and stirred for an additional hour. The reaction mixture is then processed in the usual fashion to obtain an N-isopropyl imidofluoroarsenite product as a liquid material boiling at 150°–155° C. at 9 millimeters pressure and having a refractive index $n/D$ of 1.5492 at 20° C. and a fluorine content of 12.6 percent as compared with a theoretical content of 12.58 percent.

*Example 6.—N-Tert.-Butyl Imidofluoroarsenite*

Tert.-butylamine (0.2 gram mole) is dispersed in 50 milliliters of toluene and the resulting mixture added slowly portionwise with stirring and cooling to 0.1 gram mole of arsenic trifluoride dispersed in 150 milliliters of toluene. The addition is carried out over a period of 30 minutes and at a temperature of from —10° to 5° C. Following the addition, the reaction mixture is allowed to come to room temperature and stirred for an additional hour. The reaction mixture is then processed in the usual fashion to obtain an N-tert.-butyl imidofluoroarsenite product as a liquid material boiling at 91°–92° C. at 8 millimeters pressure and having a fluorine content of 11.7 percent as compared to a theoretical content of 11.51 percent.

In a similar manner, other imidohaloarsenites are prepared as follows.

N-methyl imidochloroarsenite by reacting together arsenic trichloride and methylamine.

N-amyl imidofluoroarsenite by reacting together arsenic trifluoride and amylamine.

N-propyl imidochloroarsenite by reacting together arsenic trichloride and propylamine.

The new imidohaloarsenites have been found to be useful as parasiticides. For such use, the products may be dispersed on a finely divided solid and employed as dusts. Also, such products may be dispersed in water with the aid of a wetting agent and the resulting aqueous suspensions employed as sprays. In other procedures, the products may be employed in oils, as constituents in oil in water emulsions, or in water dispersions with or without the addition of wetting, dispersing and emulsifying agents. In representative operations, good controls of many fungal and insect pests are obtained with aqueous compositions containing from 1 to 4 pounds of the imidohaloarsenites per 100 gallons of ultimate mixture.

We claim:
1. An N-alkyl imidohaloarsenite corresponding with the formula

$$R-N=As-X$$

wherein R represents lower-alkyl and X represents a member of the group consisting of chlorine and fluorine.
2. N-ethyl imidochloroarsenite.
3. N-ethyl imidofluoroarsenite.
4. N-tert.-butyl imidochloroarsenite.
5. N-isopropyl imidochloroarsenite.
6. N-isopropyl imidofluoroarsenite.
7. N-tert.-butyl imidofluoroarsenite.
8. A method for the manufacture of an N-alkyl imidohaloarsenite corresponding with the formula $$R-N=As-X$$

wherein R represents lower-alkyl and X represents a member of the group consisting of chlorine and fluorine, which comprises reacting at least two molecular proportions of a mono(lower-alkyl)amine with one molecular proportion of a member of the group consisting of arsenic trichloride and arsenic trifluoride.

References Cited in the file of this patent

Journal of the American Pharmaceutical Association, vol. 25, June 1935, pp. 453 to 457.